US010065635B2

(12) United States Patent
Ketfi-Cherif et al.

(10) Patent No.: US 10,065,635 B2
(45) Date of Patent: Sep. 4, 2018

(54) METHOD AND SYSTEM FOR CONTROLLING A HYBRID VEHICLE WITH INDEPENDENT REAR ELECTRIC MOTORS

(71) Applicant: RENAULT s.a.s., Boulogne Billancourt (FR)

(72) Inventors: Ahmed Ketfi-Cherif, Elancourt (FR); Hoang-Giang Nguyen, Ris Orangis (FR); Christophe Dang-Van-Nhan, Villejuif (FR); Jean Van-Frank, Ruel Malmaison (FR); Jean-Louis Linda, Clermont-Ferrand (FR); Pierre Alain Magne, Clermont-Ferrand (FR)

(73) Assignee: RENAULT S.A.S., Boulogne Billancourt (FR)

( * ) Notice: Subject to any disclaimer, the term of this patent is extended or adjusted under 35 U.S.C. 154(b) by 129 days.

(21) Appl. No.: 15/339,127

(22) Filed: Oct. 31, 2016

(65) Prior Publication Data

US 2017/0043763 A1    Feb. 16, 2017

Related U.S. Application Data

(63) Continuation of application No. 14/647,362, filed as application No. PCT/EP2013/074678 on Nov. 26, 2013, now abandoned.

(30) Foreign Application Priority Data

Nov. 26, 2012    (FR) ...................................... 12 61215

(51) Int. Cl.
*B60W 20/40*     (2016.01)
*B60K 6/48*      (2007.10)
(Continued)

(52) U.S. Cl.
CPC ............... *B60W 20/40* (2013.01); *B60K 1/02* (2013.01); *B60K 1/04* (2013.01); *B60K 6/24* (2013.01);
(Continued)

(58) Field of Classification Search
CPC . B60K 6/442; B60K 6/48; B60K 6/44; B60K 6/00; B60K 1/02; B60K 1/04;
(Continued)

(56) References Cited

U.S. PATENT DOCUMENTS

| 6,123,163 | A | 9/2000 | Otsu et al. | |
| 2002/0061803 | A1* | 5/2002 | Aoki ........................ | B60K 6/44 477/3 |

(Continued)

FOREIGN PATENT DOCUMENTS

DE    10 2008 017 480 A1    10/2008
DE    10 2008 004 894 A1    1/2009
(Continued)

OTHER PUBLICATIONS

International Search Report dated Jul. 16, 2014, in PCT/EP2013/074678, filed Nov. 26, 2013.
(Continued)

*Primary Examiner* — Behrang Badii
(74) *Attorney, Agent, or Firm* — Oblon, McClelland, Maier & Neustadt, L.L.P.

(57) ABSTRACT

A method for controlling a hybrid vehicle including an internal combustion engine and electric motors each coupled to a wheel of a rear axle by a coupling device, and an electronic control unit connected to sensors, to a mechanism selecting a propulsion mode and also to the internal combustion engine and to the electric motors. The method includes: depending on running conditions of the vehicle and depending on the selected propulsion mode, controlling
(Continued)

the coupling devices, controlling operation of the internal combustion engine and of the electric motors, and controlling torque of the internal combustion engine and of the electric motors.

7 Claims, 4 Drawing Sheets

(51) Int. Cl.
*B60K 6/52* (2007.10)
*B60K 7/00* (2006.01)
*B60W 20/00* (2016.01)
*B60W 10/02* (2006.01)
*B60W 10/06* (2006.01)
*B60W 10/08* (2006.01)
*B60W 10/10* (2012.01)
*B60W 20/30* (2016.01)
*B60W 50/08* (2012.01)
*B60W 50/14* (2012.01)
*B60W 20/14* (2016.01)
*B60K 1/02* (2006.01)
*B60K 1/04* (2006.01)
*B60K 6/24* (2007.10)
*B60K 6/26* (2007.10)
*B60W 10/11* (2012.01)
*B60W 50/029* (2012.01)

(52) U.S. Cl.
CPC ............. *B60K 6/26* (2013.01); *B60K 6/48* (2013.01); *B60K 6/52* (2013.01); *B60K 7/0007* (2013.01); *B60W 10/02* (2013.01); *B60W 10/06* (2013.01); *B60W 10/08* (2013.01); *B60W 10/10* (2013.01); *B60W 10/11* (2013.01); *B60W 20/00* (2013.01); *B60W 20/14* (2016.01); *B60W 20/30* (2013.01); *B60W 50/029* (2013.01); *B60W 50/082* (2013.01); *B60W 50/14* (2013.01); *B60K 2001/0405* (2013.01); *B60K 2006/266* (2013.01); *B60W 2510/20* (2013.01); *B60W 2520/10* (2013.01); *B60W 2520/14* (2013.01); *B60W 2540/04* (2013.01); *B60W 2550/142* (2013.01); *B60W 2550/148* (2013.01); *B60W 2710/0666* (2013.01); *B60W 2710/083* (2013.01); *B60W 2710/1005* (2013.01); *B60W 2720/26* (2013.01); *B60Y 2200/92* (2013.01); *B60Y 2300/188* (2013.01); *Y02T 10/6221* (2013.01); *Y02T 10/6265* (2013.01); *Y10S 903/93* (2013.01); *Y10S 903/945* (2013.01); *Y10S 903/946* (2013.01)

(58) Field of Classification Search
CPC ... B60K 6/24; B60K 6/26; B60K 6/52; B60K 7/0007; B60K 6/04; B23P 17/00; B60W 20/40; B60W 20/14; B60W 10/02; B60W 10/06; B60W 10/08; B60W 10/10; B60W 10/11; B60W 20/00; B60W 20/30; B60W 50/029; B60W 50/082; B60W 50/14; B60W 30/18127; B60L 7/14; B60L 11/123; B60L 11/14; B60L 11/1864; B60L 11/1877; B60L 15/20; B60L 15/2009

See application file for complete search history.

(56) References Cited

U.S. PATENT DOCUMENTS

| 2004/0040375 | A1 | 3/2004 | Kadota et al. |
| 2009/0030572 | A1 | 1/2009 | Takahashi et al. |
| 2009/0242289 | A1 | 10/2009 | Murty |
| 2010/0113215 | A1 | 5/2010 | Jaeger et al. |
| 2010/0263952 | A1 | 10/2010 | Richter et al. |
| 2011/0079454 | A1* | 4/2011 | Maguire ............... B60K 6/442 180/65.25 |
| 2011/0246005 | A1 | 10/2011 | King et al. |
| 2012/0166029 | A1 | 6/2012 | Rauner |
| 2014/0051545 | A1 | 2/2014 | Berry et al. |

FOREIGN PATENT DOCUMENTS

| EP | 0 901 930 A1 | 3/1999 |
| EP | 1 393 951 A2 | 3/2004 |
| EP | 2 172 378 A1 | 4/2010 |
| EP | 2 371 646 A1 | 10/2011 |
| FR | 2 936 450 A1 | 4/2010 |
| GB | 2469183 A | 10/2010 |
| WO | WO 2009/120463 A2 | 10/2009 |
| WO | WO 2012/152613 A1 | 11/2012 |

OTHER PUBLICATIONS

French Preliminary Search Report dated Sep. 6, 2013, in Patent Application No. FR 1261215, filed Nov. 26, 2012 (with English Translation of Category of Cited Documents).

* cited by examiner

METHOD AND SYSTEM FOR CONTROLLING A HYBRID VEHICLE WITH INDEPENDENT REAR ELECTRIC MOTORS

CROSS-REFERENCE TO RELATED APPLICATIONS

This application is a continuation application of U.S. application Ser. No. 14/647,362, filed May 26, 2015, which is the U.S. National Stage Application of PCT International Application No. PCT/EP2013/074678, filed Nov. 26, 2013, which claims priority to French Application No. 12 61215, filed Nov. 26, 2012. The entire contents of each are herein incorporated by reference in their entirety.

The invention relates to the technical field of motor vehicle control systems, and more particularly hybrid motor vehicle control systems.

Hybrid vehicles provided with a heat engine on the front axle and a semi-automatic transmission allow the advantage of reduced $CO_2$ emissions at high loads. These vehicles can be provided with an electric powertrain comprising two independent electric wheel motors mounted on the rear axle. They then also benefit from reduced $CO_2$ emissions at low load.

The choice of the wheel motors on the rear axle allows savings associated with the structure of the vehicle and with the mutualisation of the chassis of a number of vehicles.

Such a hybrid vehicle can behave like an electric vehicle or like a combustion-powered (hybrid) vehicle as required by the driver. For reasons of safe operation and drag reduction during road use, the electric motors can be decoupled from the wheels when the speed of the vehicle is greater than, for example, 90 km/h. This limitation has the advantage of limiting the speed of rotation of electric machines and of increasing the gear ratio between the wheel and the machine.

Such vehicles are therefore distinctive in that the rear wheels are actuated by electric motors independently of one another. It is necessary to provide a control system suitable for this particular structure.

The following documents are known from the earlier prior art.

Document KR20110012573 discloses an alternate dual management device, comprising a computer dedicated to the electric motor and another dedicated to the heat engine.

Document KR20110010345 discloses an energy recovery device in which a change of propulsion mode makes it possible to recharge the battery of a hybrid vehicle.

Document US2011/0021310 describes a method for torque control of heat engines and electric motors in a hybrid vehicle.

Document WO2010143278 describes a device for managing the energy and state of charge of a high-voltage battery.

Document US2010/0276223 describes a system for controlling the gas emissions of a hybrid vehicle on the basis of an analysis of the exhaust gases.

Document JP2010083361 describes a method for increasing the autonomy of an electric vehicle with the management and control of two electric motors of the vehicle.

There is a need for a control system for a hybrid vehicle driven by independent rear electric machines.

The invention relates to a method for controlling a hybrid vehicle comprising an internal combustion engine coupled to the front axle and electric motors each coupled to a wheel of the rear axle by means of a coupling device, the vehicle also comprising a means for selection, by the driver, of an operating mode of the vehicle from: an electric mode, in which only the electric motors, coupled to the rear wheels by means of the coupling device, ensure the propulsion of the vehicle, a combustion mode, in which only the internal combustion engine, coupled to the front axle, ensures the drive of the vehicle, and a hybrid mode, for which the movement of the vehicle is caused by the joint operation of the heat engine and of electric motors coupled respectively to the front axle and the wheels of the rear axle.

The Vehicle Comprises an electronic control unit connected at the input to sensors sensing the running conditions and to the means for selection of the operating mode of the vehicle, and connected at the output to the internal combustion engine and to the electric motors.

The method comprises, after a step of selection of an operating mode of the vehicle by the user, a step of validation, by the electronic control unit, of the selected operating mode depending on the running conditions of the vehicle.

The validation, or not, of the selected propulsion mode can be signalled to the driver by visual, haptic or voice feedback.

The control method may comprise the following steps:
controlling the engagement or disengagement of the coupling devices depending on the running conditions of the vehicle and depending on the selected propulsion mode,
controlling the operation of the internal combustion engine and of the electric motors depending on the running conditions of the vehicle and depending on the selected propulsion mode, and
controlling the torque of the internal combustion engine and of the electric motors depending on the running conditions of the vehicle and depending on the selected propulsion mode.

During a transition from an electric mode to a combustion mode,
the request to change mode submitted by the driver can be validated,
the internal combustion engine can be started,
the speed of rotation of the internal combustion engine can be increased progressively to a point of operation corresponding to the request of the driver,
the speed of rotation of the electric motors can be cancelled progressively, then
the transmission ratio corresponding to the torque and to the speed of rotation required of the internal combustion engine can be engaged.

The speeds of the internal combustion engine and of the electric motors are modified such that the sum of the torques at the wheels provided by the internal combustion engine and the electric motors are at least equal to the torque request of the driver. This can be implemented for example by means of a suitable interface, for example the acceleration pedal or a control interface of the touch type with or without haptic force feedback.

It is possible to apply different motor or resistive torques between the left electric motor and the right electric motor, in particular depending on the normal running conditions or depending on the limits, for example when negotiating bends on a dry or wet road, and a warning message indicating a different torque setpoint between the left and right electric motors can be emitted in return.

During deceleration or regenerative braking, it is possible to control the non-slip motor torque of the rear wheels by increasing the torque requested at the electric motors in order to prevent the wheels of the rear axle from slipping.

The running conditions of the vehicle may include the speed of the vehicle, the gradient of the road, the steering angle of the wheels, and the grip of the wheel on the road surface.

The invention also relates to a system for controlling a hybrid vehicle comprising an internal combustion engine coupled to the front axle and an electric powertrain comprising electric motors each coupled to a rear wheel by means of a coupling device, characterized in that said control system comprises an electronic control unit connected by a first network to a control device of the electric powertrain and connected to the combustion powertrain by a second network, the control device of the electric powertrain being able to control independently each of the electric motors and coupling devices. The first network can be, in particular, an inter-computer and inter-system communication network, referred to as an on-board communication network, referred to hereinafter as a network.

The electronic control unit can be connected, by means of the second network, to sensors able to measure values concerning the running conditions of the vehicle.

The running conditions of the vehicle may include the speed of the vehicle, the gradient, and the grip of the wheel to the road surface.

The control device of the electric powertrain can be connected to the electric motors by a third network and also to the coupling devices.

Further objectives, features and advantages will become clear upon reading the following description, which is given merely by way of non-limiting example and with reference to the accompanying drawings, in which.

Figure 1:
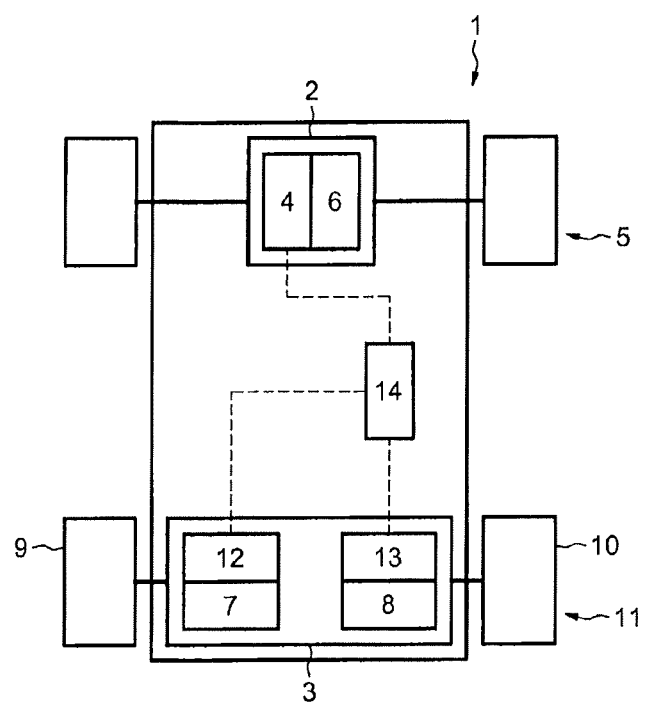
FIG. 1 illustrates a hybrid vehicle according to the invention.

FIG. 1 illustrates a hybrid vehicle 1 provided with a combustion powertrain 2 and an electric powertrain 3.

The combustion powertrain 2 comprises an internal combustion engine 4 connected to the front axle 5 by means of a semi-automatic transmission (SAT) or an automatic transmission (AT) 6.

The electric powertrain 3, or EPT for short, comprises two electric motors referenced 7 and 8, each coupled independently to one of the wheels, referenced 9 and 10, of the rear axle 11. Each electric motor 7, 8 is connected to a wheel 9, 10 by means of a coupling device 12, 13. The coupling devices 12, 13 make it possible to couple or to decouple an electric motor 7, 8 from the corresponding wheel 9, 10. The electric motors 7, 8 and the internal combustion engine 4 are also connected to a high-voltage battery 14 for the electric motors, although said battery can have some components for performing the function of a low-voltage battery intended to start up the starter of the internal combustion engine.

The wheels of the rear axle are independent. The speed of rotation and the torque of each electric motor 7, 8 can be controlled independently of those of the other electric motor.

The hybrid vehicle described can function as an electric vehicle, as a hybrid vehicle or as a combustion vehicle. It is possible to switch from one operating mode to the other when driving, exclusively following the request of the driver. In other words, the switch from one operating mode to the other does not involve any automatism with regard to the decision to activate a mode change.

For reasons of operational safety and drag reduction during road use, the electric motors are only coupled to the wheels when the speed of the vehicle is below a threshold speed, for example 90 km/h. The choice of this threshold makes it possible to limit the speed of rotation and the torque of the electric motors 7, 8 and also to limit the volume of the electric motors.

From the viewpoint of the driver, the vehicle behaves like a vehicle having an automatic transmission (AT). The passenger compartment is provided with a driving direction selector (DDS) 29, which allows the driver to select an operation in forward direction, in a rearward direction, or in neutral. The driving direction selector of the touch type thus comprises at least three positions, D (drive, for a forward direction), R (reverse, for a rearward direction), and N (neutral). The driving direction selector (DDS) 29 can be in the form of a solid or semi-solid button interface, but possibly in the form of a touchscreen, with or without haptic force feedback, or a voice control.

The passenger compartment also comprises a mode selector (MS), which allows the driver to select an electric mode, a hybrid mode or a combustion mode.

These selectors transmit the requests of the driver to change to a desired mode to an electronic control unit that validates these requests depending on the running parameters and that transmits the corresponding setpoints to the different elements of the vehicle, in particular to the powertrains and coupling devices. The electronic control unit provides the driver with information in return by means of a specific liquid crystal display screen SLCD 30 (specific liquid crystal device) or by means of a screen having OLED (organic light-emitting diode) technology, possibly of the touchscreen type, with or without integrated haptic force feedback. The driver is thus informed of the fact that his requests have been taken into consideration and is also informed of the operation of the system via messages on the screen 30 or via the change in colour and/or intensity of the screen background.

Figure 2A:
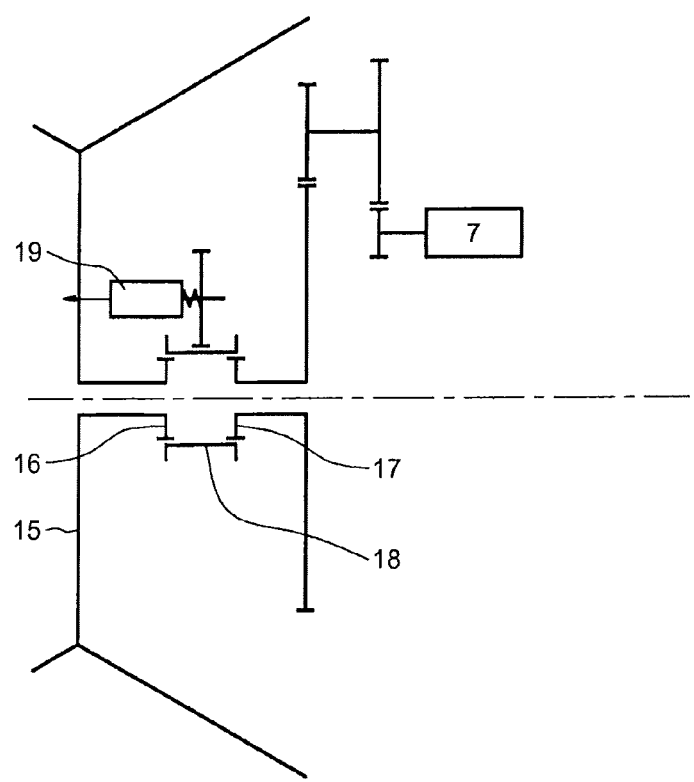
FIGS. 2A and 2B illustrate the engaged and disengaged positions of a coupling device between an electric motor and a corresponding wheel.
Figure 2B:
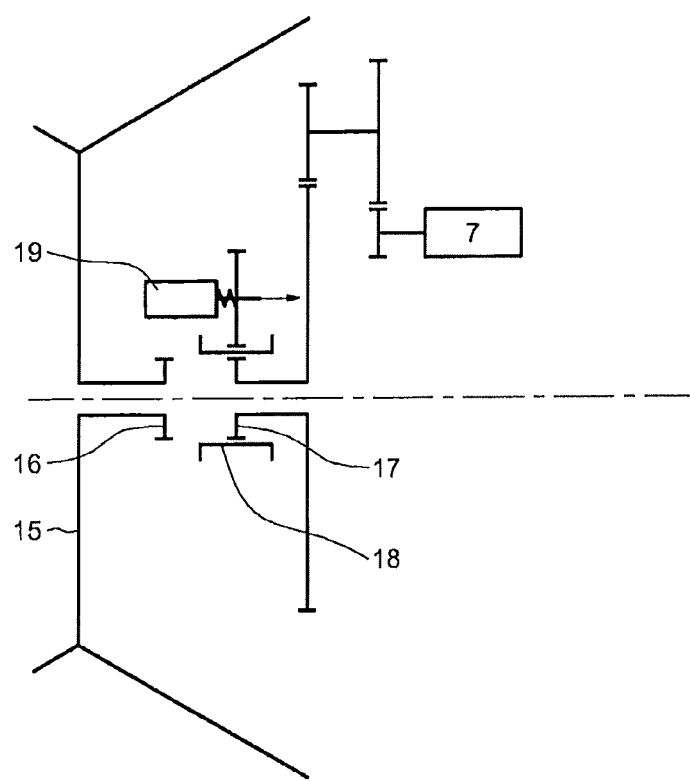

With reference again to FIG. 1, it can be seen that each electric motor 7, 8 is coupled to a rear wheel by means of a coupling device 12, 13, in particular with dog clutches. The coupling device 12, 13 having a stage with a single gear ratio is illustrated by FIGS. 2a and 2b. A device with a number of gear stages can also be envisaged within the scope of the invention.

FIGS. 2A and 2B show a rim 15 of a wheel mechanically connected to a first gear 16, arranged facing a second gear 17 connected by means of further gears to one of the electric motors 7, 8, here the electric motor referenced 7. A sliding gear 18 is located at the level of the first gear 16 and the second gear 17 and can couple or decouple said gears. The sliding gear 18 is moved in translation by a DC motor 19, for example in order to couple or decouple the first gear 16 and the second gear 17. FIG. 2a illustrates a state of the sliding gear in which the first gear 16 and the second gear 17 are coupled. FIG. 2b illustrates a state of the sliding gear in which the two aforementioned gears are decoupled. In addition, a cursor makes it possible to provide information concerning the position of the sliding gear 18.

Figure 3:
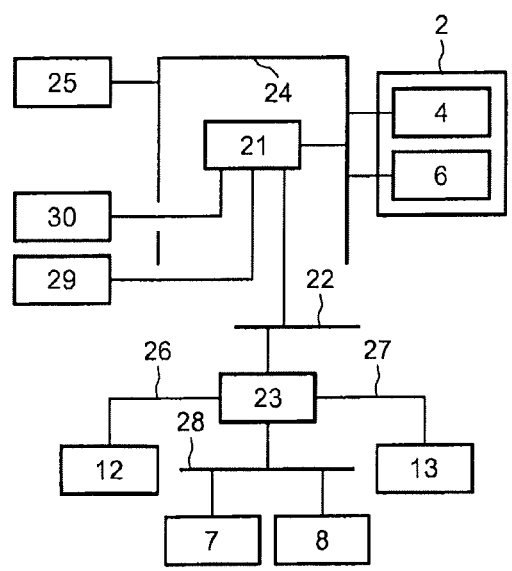
FIG. 3 illustrates the control system of the hybrid vehicle.

FIG. 3 illustrates the control system of the hybrid vehicle. The control system comprises an electronic control unit 21 connected by a first CAN (controller area network), referenced 22, to the control device 23 of the electric powertrain. The electronic control unit 21 is also connected by a second CAN referenced 24 to the combustion powertrain 2, and in particular to the internal combustion engine 4 and to the semi-automatic or automatic transmission 6. The electronic control unit 21 is also connected to sensors 25 by means of the second CAN 24. The sensors 25 communicate values concerning the running conditions of the vehicle, which include the speed of the vehicle, the gradient of the road, and the grip of the wheel on the road. The sensors 25 can be replaced entirely or in part by estimation means.

The control device 23 of the electric powertrain is connected by a first connection 26 to a first coupling device 12 connected mechanically to a first electric motor 7. The control device 23 of the electric powertrain is connected by a second connection 27 to the second coupling device 13 connected mechanically to the second electric motor 8. Lastly, the control device 23 is connected to the electric motors 7, 8 by a third CAN referenced 28.

Further networks can be envisaged within the scope of the invention, such as on-board communication networks of the Flexray or LIN (local interconnect network) type, or on-board communication networks of the IP (Internet protocol) network type, or power-line communication (PLC) networks, or wireless networks of the Wi-Fi or Bluetooth type, etc.

The electronic control unit 21 controls the changing of the mode of the vehicle between the combustion, electric and hybrid modes depending on the dynamic conditions of the vehicle and the requests of the driver.

Depending on the running conditions, the electronic control unit 21 sends controls via the CANs to different elements. It sends in particular a mode command to the control device 23 of the electric powertrain in order to pass from one operating mode to another. For this, the control device 23 of the electric powertrain controls the coupling device 12, 13 which connects each electric motor 7, 8 to the corresponding rear wheel. It is then possible to disengage the coupling, the vehicle moving by propulsion solely by the internal combustion engine 4 by positioning the coupling device in the configuration illustrated by FIG. 2B. It is possible to engage the coupling by positioning the coupling device in the configuration illustrated by FIG. 2A. The vehicle then moves by the combined propulsion of the internal combustion engine 4 and the rear electric motors 7, 8.

In addition to the control of the coupling devices 12, 13, it is necessary to control the torque and the speed of rotation of the internal combustion engines 4 and of the electric motors 7, 8.

An example of control of the motors during a mode change will be described below.

During a transition from an electric mode to a combustion mode, after validation of the request to change mode submitted by the driver, the electronic control unit 21 carries out the following method steps:
 the internal combustion engine 4 is started,
 the speed of rotation of the internal combustion engine 4 is increased progressively to the point of operation determined in accordance with the torque request of the driver,
 at the same time, the speed of rotation of the electric motors 7, 8 is reduced progressively.

The variations of rotational speed of the motor are implemented whilst keeping the speed of the vehicle in line with the torque request of the driver.

At the same time as the mode change control, the electronic control unit 21 controls the semi-automatic transmission (SAT) or automatic transmission (AT) referenced 6.

The other mode changes can be implemented on the basis of this example by ensuring in particular when switching to an electric or hybrid mode that the state of charge of the battery, denoted SOC (for 'state of charge') allows the operation of the electric motors.

In addition, when setting off in a forward direction in combustion mode, with assistance of the electric mode (hybrid mode), the driving direction selector being in position D, the electronic control unit 21 controls the SAT or AT 6 such that it is positioned in second gear in order to prioritize the driving comfort. This control is implemented if the state of charge SOC of the battery 14 makes it possible to power the electric motors 7, 8. The condition is in particular that the battery is not empty, the SOC then being greater than an empty battery threshold.

If the SOC of the battery is lower than or equal to an empty battery threshold, a message advising the driver to switch into combustion mode and an empty battery message will be displayed on the SLCD screen 30.

In case of anomaly of the electric motors 7, 8, the SAT or AT 6 is positioned in first gear.

If the SOC of the battery is low, that is to say the SOC is below a predetermined low battery threshold, greater than the empty battery threshold, a "low battery" warning message will be displayed on the SLCD screen 30.

In rear drive, when setting off in combustion mode in a rearward direction, without assistance of the electric mode (hybrid mode), the driving direction selector 29 being in position R, the electronic control unit 21 controls the SAT or AT 6 so that it is positioned in rear drive.

In order to avoid the appearance of a difference in torque between the front and rear gears when setting off, when the driving direction selector is in position R, the torque of the internal combustion engine 4 is limited such that it is equal to the maximum torque of the electric motors 7, 8 in rear drive.

The electronic control unit 21 ensures the coherence in the formulation of the torque setpoints of the combustion 2 and/or electric 3 powertrains in order to give them the same drive direction. It also ensures their coherence in order to maintain the stability of the vehicle when setting off and during use.

In electric mode or when setting off in combustion mode assisted electrically, the electronic control unit 21 can emit different torque setpoints to the electric motors 7, 8. The control device 23 of the electric powertrain then emits a warning message to the electronic control unit 21 indicating a different torque setpoint between the electric motors 7, 8. Such a message is processed by the electronic control unit 21 depending on the setpoints emitted and the running conditions of the vehicle.

In electric mode and in combustion mode assisted by the electric motors, the electronic control unit 21 carries out a detection of asymmetric slip (ASR) on the rear axle, during acceleration and when setting off and during an electric acceleration phase, in order to transmit these to the control device 23 of the electric powertrain.

The recovery of energy by the electric motors 7, 8 makes it possible to recharge the battery 14 of the vehicle. For speeds below 90 km/h, by lifting the foot from the accelerator, energy is recovered via the electric motors. This energy recovery is maintained during braking phases by ensuring that there is no interference with the braking system (ABS or anti-lock braking system, ESP or electronic stability program, etc.).

With deceleration (electric regeneration), when the foot is lifted, the electronic control unit 21 controls the motor torque of the rear wheels by increasing the torque requested at the electric motors 7, 8 in order to avoid any slipping of the rear axle. The motor torque control is of the MSR type (German acronym for engine-drag torque control).

In addition to the running conditions, which are constituted by the speed of the vehicle and the value of 90 km/h beyond which a switch into purely electric mode is forbidden, the running situation when negotiating bends is taken into consideration as follows:

if the speed is below 50 km/h and the steering angle when driving is below 80°, the mode change is authorized. Beyond this, the mode change is forbidden.

if the speed is below 70 km/h and the steering angle during driving is below 45°, the mode change is authorized. Beyond this, the mode change is forbidden.

if the speed is below 90 km/h and the steering angle during driving is below 25°, the mode change is authorized. Beyond this, the mode change is forbidden.

The grip of the front tyres on the road surface is also taken into consideration. Thus, the computer does not validate the request to change mode if the vehicle is under traction control by the ASR device on the front axle.

The grip of the rear tyres on the road surface is also taken into consideration, in particular when the supervisor increases the torque required of the electric machines in order to avoid slipping of the rear axle. In such situations and regulation, the computer will not validate a mode change of the vehicle.

The same is true in the case of unsymmetrical rear regulation, where a different torque setpoint is generated between the right and left motors: any request to change mode during this phase will be rejected.

The invention claimed is:

1. A method for controlling a hybrid vehicle including an internal combustion engine coupled to a front axle and electric motors each coupled to a wheel of the rear axle by a coupling device, and a means for selection, by a driver, of an operating mode of the vehicle from:
    an electric mode, in which only the electric motors, coupled to rear wheels by the coupling device, ensure propulsion of the vehicle;
    a combustion mode, in which only the internal combustion engine, coupled to the front axle, ensures drive of the vehicle; and
    a hybrid mode, for which movement of the vehicle is caused by joint operation of the internal combustion engine and electric motors coupled respectively to the front axle and the wheels of the rear axle;
    the vehicle further including an electronic control unit connected at an input to sensors sensing running conditions and to the means for selection of the operating mode of the vehicle, and connected at an output to the internal combustion engine and to the electric motors, the method comprising, after a selection of an operating mode of the vehicle by the driver, validation, by the electronic control unit, of the selected operating mode depending on the running conditions of the vehicle.

2. A method for controlling a hybrid vehicle according to claim 1, wherein the validation, or not, of the selected propulsion mode is signalled to the driver by visual, haptic, or voice feedback.

3. A method for controlling a hybrid vehicle according to claim 1, further comprising:
    controlling engagement or disengagement of the coupling devices depending on the running conditions of the vehicle and depending on the selected propulsion mode;
    controlling operation of the internal combustion engine and of the electric motors depending on the running conditions of the vehicle and depending on the selected propulsion mode; and
    controlling torque of the internal combustion engine and of the electric motors depending on the running conditions of the vehicle and depending on the selected propulsion mode.

4. A method for controlling a hybrid vehicle according to claim 1, wherein, during a transition from an electric mode to a combustion mode,
    a request to change mode submitted by the driver can be validated,
    the internal combustion engine is started,
    speed of rotation of the internal combustion engine is increased progressively to a point of operation corresponding to the request of the driver,
    speed of rotation of the electric motors is cancelled progressively, then
    a transmission ratio corresponding to torque and to the speed of rotation required of the internal combustion engine is engaged,
    the speeds of the internal combustion engine and of the electric motors being modified such that the sum of the torques at wheels provided by the internal combustion engine and the electric motors are at least equal to the torque request of the driver.

5. A method for controlling a hybrid vehicle according to claim 1, wherein different motor or resistive torques are applied between a left electric motor and a right electric motor, and
    a warning message indicating a different torque setpoint between the left and right electric motors is emitted in return.

6. A method for controlling a hybrid vehicle according to claim 1, wherein, during deceleration or regenerative braking, a non-slip motor torque of the rear wheels is controlled by increasing torque required at the electric motors to prevent wheels of the rear axle from slipping.

7. A method for controlling a hybrid vehicle according to claim 1, wherein the running conditions of the vehicle include speed of the vehicle, gradient of the road, steering angle of the wheels, and grip of the road.

* * * * *